No. 781,326. PATENTED JAN. 31, 1905.
W. BEETZ.
URINAL OR THE LIKE.
APPLICATION FILED JULY 11, 1904.

Witnesses:

Inventor:
Wilhelm Beetz,
by W. E. Boulter,
his Attorney

No. 781,326.

Patented January 31, 1905.

UNITED STATES PATENT OFFICE.

WILHELM BEETZ, OF VIENNA, AUSTRIA-HUNGARY.

URINAL OR THE LIKE.

SPECIFICATION forming part of Letters Patent No. 781,326, dated January 31, 1905.

Application filed July 11, 1904. Serial No. 216,165.

*To all whom it may concern:*

Be it known that I, WILHELM BEETZ, a citizen of Austria-Hungary, residing at Vienna, in the Province of Lower Austria, in the Empire of Austria-Hungary, have invented certain new and useful Improvements in Urinals or the Like, of which the following is a full, clear, and exact specification.

The present invention relates to urinals and the like; and it consists of a sanitary waste-fitting to prevent the escape of gases, the liquid flowing away according to well-known laws of hydrostatics, as when vessels communicate with one another. According to the said improvement a siphonic device is employed, as hereinafter described, providing an odor-proof seal with a layer of oil on the top, the present invention being an improvement upon a patent granted to me for Great Britain, No. 16,447, dated September 28, 1891.

Figure 1:
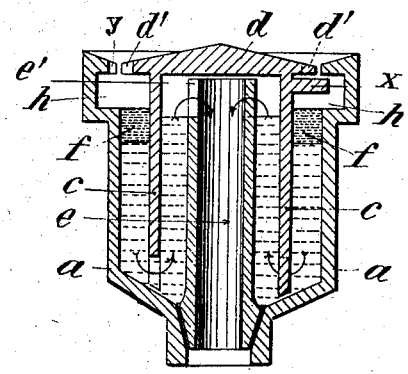
Figure 2:
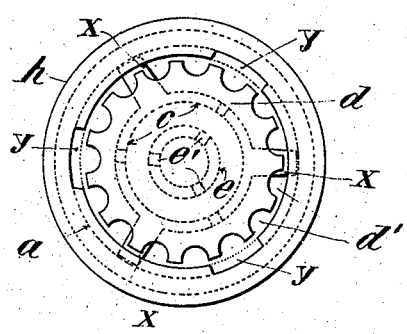

The purpose of the invention is to effect the greatest possible economy of oil by providing a space in which the covering layer of oil can give way under the superior weight of the liquid flowing and accumulating upon it in the outer ring-space of the fitting, whereby after the latter has flowed away the oil with some liquid may flow back and re-form the seal. This object is attained by the device illustrated in vertical section in Figure 1 and in plan in Fig. 2 of the accompanying drawings, to which reference will hereinafter be made.

The outer vessel $a$, which may be either independently inserted or integral with the basin of the urinal, is provided at its upper end with an overhung enlargement $h$, of any suitable shape in section—*e. g.*, angular, circular, oval, &c.

When there is a greater flow of liquid and of greater specific gravity than the oil layer $f$, forming part of the seal, the oil will be raised to a higher level by the other liquid and be forced to enter the enlargement $h$, owing to its lighter specific weight. The resistance of the liquid against the walls of the cylinders $a\ c\ e$ is so great that during the inflow of liquid through the openings $d'$ into the space inclosed by the cylinders $a$ and $c$ there will be an accumulation of liquid and a rise of the oil $f$ in the enlargement $h$. It is essential to the attainment of this result that the inlets $d'$ be in the aggregate larger than the outlet-slots $e'$ sufficiently to permit the passage in any given time of a larger volume of liquid than can be forced out through the outlets $e'$ or over the top of the stand-pipe $e$. The oil layer $f$ remains in this enlargement $h$ until the liquid which was poured into it begins to flow out again, owing to the corresponding flow through the slots $e'$ in the stand-pipe $e$. Thereupon the oil returns from out of the enlargement $h$ into the annular space embraced by the outer vessel $a$ and so re-forms the air or odor-proof seal. In consequence of the distribution of the oil by the liquid as the latter is flowing away considerably fewer particles are carried away with it, it being unnecessary for the waste liquid to penetrate, as heretofore, the oil layer, and therefore a saving of oil, amounting to about fifty per cent., is effected as compared with any previous arrangements for a similar purpose. The enlargement $h$ is at the same time used as a means for fixing the bell $d\ c$, studs $x$ being arranged upon the under side of the cover $d$ or upon the bell $c$ itself, which studs agree with corresponding gaps $y$ in the overhanging flange of the enlargement $h$, partly entering the latter and gripping under the flange, and thus preventing the removal of the cover and bell except when desired. By this means tampering with the oil layer or mischievously interfering with the seal is avoided.

Having now particularly described and ascertained the nature of my said invention and in what manner the same is to be performed, I declare that what I claim is—

A sanitary waste-fitting for urinals and the like comprising a vessel combined with a bell-siphon and stand-pipe the whole forming a liquid seal—the liquid being covered with a layer of oil—together with an enlargement such as $h$ around the upper edge of the vessel, said enlargement being for the purpose of receiving the oil which is forced up into same when the water, urine or other liquid flows down into the seal, by reason of the comparative lightness of the oil and the accumulation of the water or other liquid in the annular space surrounding the bell, the oil returning to its original level after the other liquid has run away, with the result that the oil is prevented from being carried away with the other liquid, the whole substantially as described.

In testimony that I claim the foregoing as my invention I have signed my name in presence of two subscribing witnesses.

WILHELM BEETZ.

Witnesses:
  WILHELM ZORGER,
  ALVESTO S. HOGUE.